(12) United States Patent
Zheng et al.

(10) Patent No.: US 8,560,092 B2
(45) Date of Patent: Oct. 15, 2013

(54) APPARATUS AND METHOD FOR MODEL QUALITY ESTIMATION AND MODEL ADAPTATION IN MULTIVARIABLE PROCESS CONTROL

(75) Inventors: Qingsheng Quinn Zheng, Sugar Land, TX (US); Hong Zhao, Sugar Land, TX (US)

(73) Assignee: Aspen Technology, Inc., Burlington, MA (US)

( * ) Notice: Subject to any disclaimer, the term of this patent is extended or adjusted under 35 U.S.C. 154(b) by 799 days.

(21) Appl. No.: 12/786,052

(22) Filed: May 24, 2010

(65) Prior Publication Data

US 2011/0130850 A1 Jun. 2, 2011

Related U.S. Application Data

(60) Provisional application No. 61/217,370, filed on May 29, 2009.

(51) Int. Cl.
*G06F 19/00* (2011.01)
(52) U.S. Cl.
USPC ............................ 700/28; 700/52; 700/128
(58) Field of Classification Search
USPC .......... 700/28, 29, 37, 52, 128, 108; 703/2, 3, 703/12
See application file for complete search history.

(56) References Cited

U.S. PATENT DOCUMENTS

| | | | |
|---|---|---|---|
| 6,819,964 B2 | 11/2004 | Harmse | |
| 6,826,521 B1 | 11/2004 | Hess et al. | |
| 6,937,966 B1 * | 8/2005 | Hellerstein et al. | 703/2 |
| 6,947,876 B1 | 9/2005 | Galarza et al. | |
| 7,085,615 B2 * | 8/2006 | Persson et al. | 700/108 |
| 7,209,793 B2 | 4/2007 | Harmse et al. | |
| 7,213,007 B2 * | 5/2007 | Grichnik | 706/21 |
| 7,330,804 B2 * | 2/2008 | Turner et al. | 700/29 |
| 2006/0111858 A1 | 5/2006 | Zhu | |
| 2007/0225835 A1 * | 9/2007 | Zhu | 700/44 |

FOREIGN PATENT DOCUMENTS

WO  WO 2008/119008 A1  10/2008

OTHER PUBLICATIONS

Forssell and Ljung, "Closed-loop identification revisited." Automatica. v35 i7. 1215-1241. 1999.
Ljung, L. "System Identification: Theory for the Users, Second Edition," Linköping University, Sweden, Princeton-Hall, 1999.
International Search Report and Written Opinion of PCT/US2010/035960 dated May 24, 2010.
Notification Concerning Transmittal of International Preliminary Report on Patentability from PCT/US2010/039560, date of mailing Dec. 8, 2011.
Notification of Transmittal of The International Search Report and The Written Opinion of the International Searching Authority, or the Declaration from PCT/US 2010/035960, date of mailing Aug. 16, 2010.

* cited by examiner

*Primary Examiner* — Kidest Bahta
(74) *Attorney, Agent, or Firm* — Hamilton, Brook, Smith & Reynolds, P.C.

(57) ABSTRACT

Apparatuses and methods for model quality estimation and model adaptation in multivariable process control are disclosed. A method for updating a multiple input multiple output (MIMO) dynamical model of a process includes perturbing the process, auditing the controller model, identifying poor performing submodels and re-testing the relevant process variables, re-identifying submodels and adapting the model online while the process continues to operate within normal operating parameters. An apparatus comprises an online multivariable controller, a tester, a database to store data corresponding to manipulated variables and controlled variables, and a performance diagnosis module configured to identify problematic submodels and adapt a model used by the controller.

28 Claims, 8 Drawing Sheets

FIG. 8

APPARATUS AND METHOD FOR MODEL QUALITY ESTIMATION AND MODEL ADAPTATION IN MULTIVARIABLE PROCESS CONTROL

RELATED APPLICATIONS

This application claims the benefit of U.S. Provisional Application No. 61/217,370, filed on May 29, 2009. The entire teachings of the above application are incorporated herein by reference.

BACKGROUND OF THE INVENTION

Model Predictive Control (MPC) is the most widely used advanced process control technology in process industries, with more than 5,000 worldwide applications currently in service. MPC, which is sometimes also referred to as Multivariable Control (MVC), employs a model predictive controller that relies on dynamic models of an underlying process, e.g. linear models obtained by system identification.

A common and challenging problem is that MPC control performance will degrade with time due to inevitable changes in the underlying subject process, such as equipment modifications, changes in operating strategy, feed rate and quality changes, de-bottlenecking, instrumentation degradation, etc. Such degradation of control performance results in loss of benefits. Among all possible causes of control performance degradation, the model's predictive quality is the primary factor in most cases. To sustain good control performance, the model's predictive quality needs be monitored, and the model needs be periodically audited and updated if necessary.

However, it is a technically challenging and resource-intensive task to pinpoint a problematic model and re-identify a new model for replacement in a MPC application. In a large scale MPC application, over a hundred variables may be involved. Conducting a re-test and re-identification may take an experienced engineer weeks of intensive work and cause significant interruption to the normal operation as well.

Practically, only a subset of the model is to blame for control performance degradation in many applications. Techniques for isolating and then updating this Subset of the Model are sought (we will use "submodels" hereafter as the abbreviation for "subset of a model").

SUMMARY OF THE INVENTION

Embodiments of the invention, provide new apparatuses and methods to address the foregoing problems by monitoring, auditing, re-testing, re-identifying and updating a control model in an MPC application.

Embodiments provide expansion and integrated use of automated closed loop step testing techniques described for example in U.S. Pat. No. 7,209,793 to Harmuse, et al. (by assignee). Embodiments can be configured and executed to generate and collect required data for model predictive quality assessment while minimizing negative impact to the underlying process operation.

Embodiments provide an innovative model quality evaluation module which can help to identify subsets of a model that cause the control performance deterioration.

Embodiments provide a new automated data slicing technique to select data suitable for model assessment and model re-identification.

An embodiment is an apparatus comprising:
an online integrated multivariable controller and tester to automatically perturb the process while maintaining its safety,
a database to store (i) the data corresponding to at least one manipulated variable controlled by the controller and tester and (ii) the data corresponding to at least one controlled variable dependent on the at least one manipulated variable, and
a performance diagnosis module configured to identify problematic submodels based on the data. Also an online model identification module produces an updated model used by the controller.

An embodiment is a method for updating a multiple input multiple output (MIMO) dynamical model of a process. The method includes auditing the model by automatically perturbing the process while the process is still under closed-loop control, and identifying poor-performing/problematic submodels, re-testing (further perturbing) process variables relevant to the submodels, re-identifying the submodels, assembling a new model suitable for the controller, and automatically updating the online controller with the new model. Model adaptation is performed online, with the process continuing to operate within normal operating limits of the process.

The method may further include using the existing model in the online controller as an initial model to configure a tester such as described in U.S. Pat. No. 7,209,793 by assignee (and herein incorporated by reference) for the model auditing purpose. The tester may include the manipulated variables (MVs) that will be perturbed and controlled variables (CVs), the control limits and constraints imposed on MVs and CVs for process safety and normal operation, the profiles of testing signals on MVs, and the durations of testing time, etc.

The process may be automatically perturbed, e.g., using a generalized binary noise signal (GBNS) while the process CVs are under control with an online MPC controller.

An embodiment is an apparatus and method for collecting, validating, preprocessing and selecting the collected process data for model quality assessment and model identification. The method may further include using calculated status in each MV and CV available in the online controller or tester for automated data validation and slicing in model quality assessment and identification.

The method may further include automated data validation and slicing by creating a custom calculation formula in the database where the process data is stored.

The method may further include screening the collected data from the process. The result of data screening may indicate the data's sufficiency for model quality assessment or model re-identification. Data screening may be performed automatically at a specified time period and at a specified execution frequency.

The method may further include automatically slicing the process data based on one or more data selection criterion to mark out invalid data segments corresponding to data gaps, bad or missing data, "none or less moving" data, highly cross-correlated MVs' data, etc. that may generate negative impacts to model assessment and identification if being used.

The apparatus may further include an automatic data slicer configured to select data suitable for diagnosis by the performance diagnosis module.

The data slicer may further comprise a status converter configured to download operational status data of MVs and CVs and operational status of the controller and convert the status data into data flags associated with subsets of the at least one MV and the at least one CV.

The data slicer may further comprise a preprocessing module to select data segments by generating good or bad slices to prepare required data for model quality auditing and identification.

The data slicer may further comprise a configurable event-driven data slice generator to automatically exclude "unwanted" data during an event period for model auditing and identification.

The data slicer may further comprise an automatic data slice generator to automatically exclude those variables without enough sensible variations for model auditing and identification.

The data slicer may further comprise an automatic data slice generator to automatically exclude those independent variables with significant cross-correlation.

The data slicer may further comprise a data slice generator to automatically exclude bad data during an event period for model auditing and identification.

Another embodiment is a method of auditing a multiple input multiple output (MIMO) model. The method comprises automatically factoring the model into submodels according to the model used in the MPC controller and the availability of validated measurements of data, monitoring each submodel, evaluating each submodel's predictive performance, diagnosing problematic submodels, perturbing process variables relevant to the problematic submodels, re-identifying submodels and adapting the model automatically.

The method may further include estimating model quality and identifying poor-performing (or problematic) subset of models (submodels).

Estimating model quality may further include dividing the MIMO model into a group of multiple input and single output (MISO) submodels, factoring each MISO submodel into multiple single input and single output (SISO) dynamic model outputs and a set of associated gain multipliers, and assessing quality of the submodel using a fuzzy logic rule based on the factored submodels.

The method may further include estimating gain multipliers for each MISO submodel instead of estimating a full MISO dynamical model. The gain multipliers may be steady state gain multipliers with lower dimension. The estimated gain multipliers may be unbiased estimates.

Estimating model quality may further include calculating the dynamic uncertainty of each SISO submodel, with lower data requirement than re-identifying the submodel. The dynamic model uncertainty is defined as a value measure of predictive objective function that represents the dynamic deviation between a controller's FIR (Finite Impose Reponse) submodel curve and a re-estimated SISO model curve.

Estimating model quality may further include calculating frequency domain model uncertainty for each submodel, with lower data requirements than re-identifying the model. The at least one uncertainty measure may be calculated online from measurements of MVs and at least one of CVs of the process.

Identifying poor-performing/problematic submodels may further include assessing the overall quality of each submodel by use of a fuzzy logic rule that will draw a conclusion for each submodel based on four calculated scores of the model quality:

a. the submodel's gain multiplier estimation;
b. the submodel's dynamic uncertainty;
c. the submodel's frequency uncertainty at zero frequency;
d. the submodel's frequency uncertainty at major crossing-point frequency;

wherein the fuzzy logic rule may be developed and modified based on the process and control domain-knowledge and expertises such that the conclusions will not necessary be a simple summation of the four calculated scores.

Identifying poor-performing/problematic submodels may further include using a discrete grading system for each of the four model quality measures as well as the final conclusive quality measure, i.e. Good (G), Fair (F), Poor (P) and Bad (B). Identifying poor-performing/problematic submodels may further include using an "Unknown" category in the conclusive assessment of a submodel when either one or more quality measures of a submodel are significantly inconsistent or the validated data segments are insufficient to calculate at least one type of model quality scores.

The method may further include displaying the quality of the model in a carpet plot. Typically, a carpet plot may be a M by N two dimension map with grids corresponding to the M process inputs (i.e. MVs and FFs or Feed Forward Variables) and N outputs (CVs). Different colors may be used to display different levels of quality.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 8 is a example of a Model Quality KPI carpet plots displaying model qualities in colors according to an embodiment of the invention.

DETAILED DESCRIPTION OF THE INVENTION

A description of example embodiments of the invention follows.

The teachings of all patents, published applications and references cited herein are incorporated by reference in their entirety.

Embodiments provide a new apparatus and method for monitoring and estimating a model's degradation of predictive quality, diagnosis of poorly performing submodels, automated process perturbation (testing), model re-identification and adaptation. Different modes of operation are provided in embodiments, namely: Configuration mode, Audition mode, Test mode, Identification mode, and Model adaptation mode. Below, an overview of system elements is provided, followed by a discussion of operational modes, process modules/methods and mathematical details.

Figure 1:
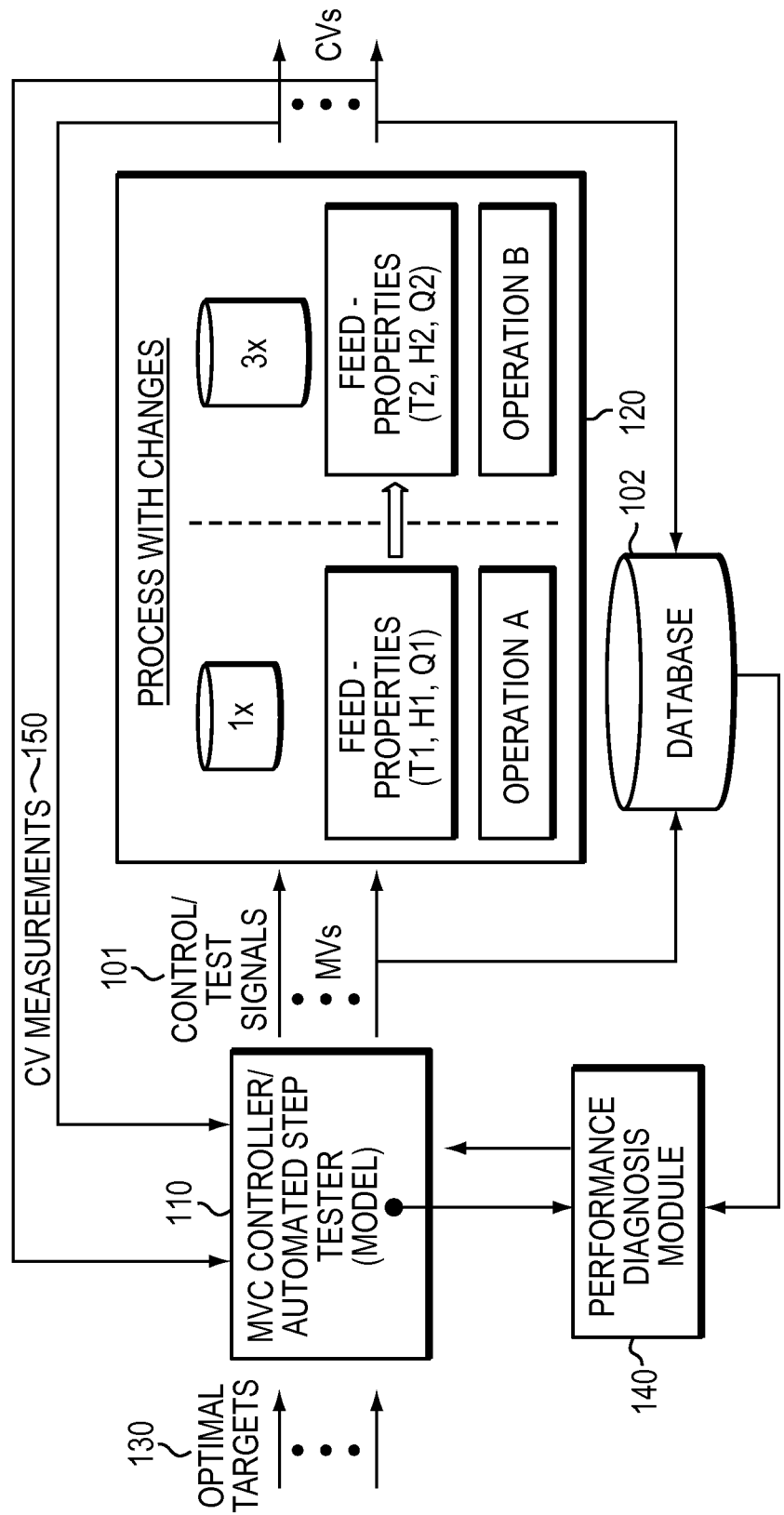
FIG. 1 is a system diagram of an embodiment of the invention.

FIG. 1 is a system diagram of an embodiment of the invention. An MPC controller 110 controls a subject dynamical process 120 based on optimal targets 130. The controller 110 includes an automated tester to perturb the process 120 in an embodiment. While FIG. 1 shows the controller and the tester together as 110, it should be understood by one of ordinary skill in the art that in another embodiment, a separate controller and tester may be provided. The controller 110 sends control/test signals 101 that set the values of manipulated variables (MVs) of the process. The MVs are independent variables in the sense that they can be set as desired to perturb the process and to control the controlled variables (CVs) within their constraints set and operation limits. Measurements of control variables (CVs) 150 resulting after perturbation are fed back to the controller 110. Control variables are so named because they are controlled through the manipulated variables; thus, the CVs are dependent variables that depend on the MVs. A real-time database 102 is used to store historical data regarding the MVs and the corresponding CVs. Although multiple optimal targets 130, MVs, and CVs are shown in FIG. 1, it should be understood that there may be a single optimal target, MV, and/or CV. A performance diagnosis module 140 diagnoses performance of the model, based on inputs and outputs from the process 120 and the database 102, and updates (adapts) the model to improve performance.

In Configuration mode, the MPC controller/step-tester 110 can be setup with scheduled safe testing on selected MVs (control/test signals 101) by use of the automated closed loop step testing techniques described in Magiel J. Harmse and Qingsheng Zheng, "Automated closed loop step testing of process units," U.S. Pat. No. 7,209,793 B2 (Apr. 24, 2007), by assignee, the contents of which are incorporated herein by reference in their entirety.

In Audition mode, the controller's output, i.e. data related to MVs 101 and measurements of CVs 150, are collected and stored into the database 102 at a specified sampling frequency, usually the same as used by the MPC controller 110. The apparatus automatically or manually (on-demand) audits the model at specified time periods and then reports and stores the results of auditing the model. If the collected process MVs and CVs data for auditing are evaluated and found not sufficient to make conclusive judgments on model predictive quality, the apparatus will automatically switch or suggest to the user to switch onto Test mode.

In Test mode, the MPC controller/step-tester 110 uses known techniques (e.g., those of U.S. Pat. No. 7,209,793 cited above) to generate General Binary Noise (GBN) signals and perturb the process 120 under control with certain MVs.

In Identification mode, data from the database 102 corresponding to MVs and CVs are preprocessed, and model identification is performed automatically or manually (on-demand) at a specified time period, with the results reported and stored. Subspace identification techniques for model identification are utilized.

In Model Adaptation mode, identified model results from the Identification mode are reviewed and validated against selected historical data and compared with the model currently used by the MPC controller 110. Validated and confirmed submodels (or the full model) are uploaded into the controller 110 to replace problematic models for model adaptation. Below, an overview of model adaptation is provided, followed by mathematical details in separate sections on gain multipliers and model uncertainty.

Overview of Model Adaptation

Model quality evaluation as disclosed herein is a novel technique that takes advantage of existing models in calculating a model quality index with a lower requirement on data than conventional techniques (e.g., commonly used model identification algorithms). In some embodiments, regular operating data is used for model quality evaluation. Embodiments use the following techniques:

Assuming a gain multiplier for each input-output pair, the multi-input, multi-output (MIMO) model can be divided into multiple multi-inputs, single output (MISO) submodels.

For each MISO sub-system, CV prediction (CVp) is formulated as a linear function of the dynamic model outputs from each iput-output channel and a vector of gain multipliers, i.e., $$CVp = vec(CVi) * vec(Gain\ Multiplier);$$

Using online data regarding measured MVs and CVs, only the gain multipliers are estimated, rather than re-estimating the full process dynamic model $y=G(q)\ U$ for each MISO channel. This technique requires much less data than estimating a full dynamic model. Applicants have developed a special module dealing with CV prediction errors to achieve unbiased estimation of the gain multipliers (details presented below in "Gain Multiplier Estimation").

If all the elements of the gain multiplier vector for a submodel are estimated to have values close to unity, the corresponding submodel is said to be valid. If any gain multiplier is found with a value that is substantially larger or smaller than unity (see Table 1 below for examples of "substantially larger or smaller than unity"), the corresponding input-output submodel is marked as a possible "bad" submodel, subject to further detection from other methods (e.g., model uncertainty calculation as described below).

In the case of the relationship between an independent variable and dependent variable of the underneath process has changed significantly in its dynamics which cannot be adequately represented using a gain multiplier alone, the applicants have developed another approach to evaluate the dynamic mismatchs in term of a dynamic model uncertainty (details presented below in "Evaluating Submodel's Dynamic Uncertainty")

Another model uncertainty measure in the frequency domain is calculated from online measurements and is used to further check each SISO submodel's predictive performance (details presented below in "Frequency-domain Model Uncertainty Calculation").

A combined score for each SISO submodel's performance is calculated by combining the gain multiplier estimation (steady-state performance evaluation) results, Submodel's dynamic uncertainty and the frequency-domain model uncertainty. The preferred embodiment uses a fuzzy logic rule (details presented below in "Overall Model Predictive Quality Assessment Using Fuzzy Logic") to calculate this combined score. In an embodiment, the conclusive model quality assessment is then presented and reported in a carpet-plot format (e.g., using color to display different levels at each cell of a two-dimensional or higher-dimensional plot) as one of the model's key performance indicators (KPIs). See FIG. 8 discussed later.

Figure 3:
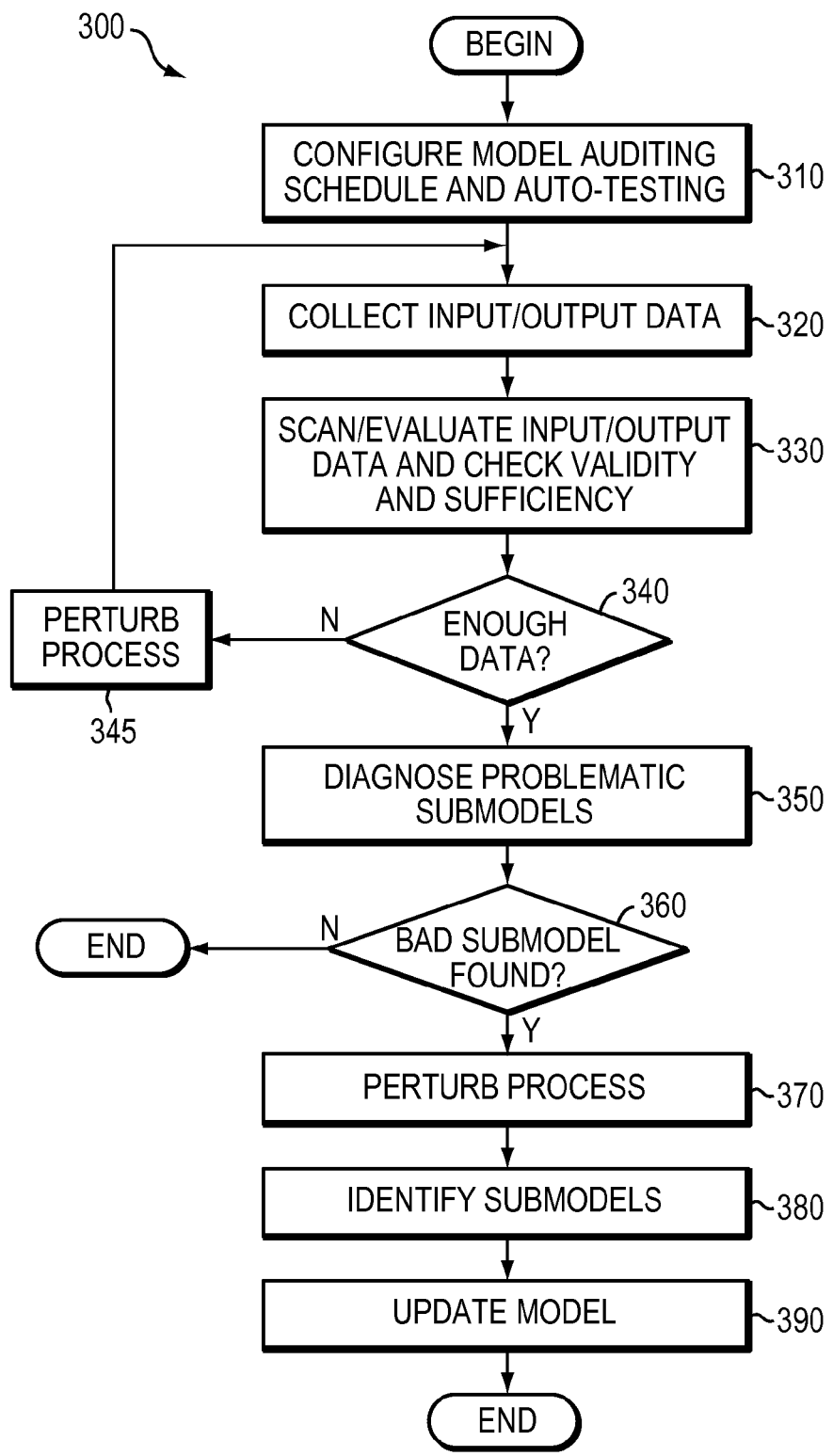
FIG. 3 is a flow diagram depicting model adaptation according to an embodiment of the invention.

FIG. 3 is a flow diagram depicting data validation and model adaptation according to an embodiment of the invention. After data validation and model adaptation process 300 begins, model auditing schedules are configured (310) in either automatic mode or user specified mode based on the user's preference. The measurements data of MVs and CVs based on the online MPC controller 110 are collected at a fixed or specified sampling rate (320). Accumulated MVs and CVs data are pre-processed (scanned or screened) and evaluated (330) according to the magnitudes of MVs' accumulated moves and their corresponding CVs' responses. A special criterion for process excitation measure and a MVs' cross-correlation analysis are used in selecting valid data slices and determining the data sufficiency for model assessment and identification. If the accumulated data are not sufficient for evaluating at least one MV-CV sub-model, further process perturbations are suggested. If the accumulated data are sufficient (340) for evaluating at least one MV-CV submodel, the process will move (340) to step 350 and starts the model assessment part of the process. Problematic sub-models are diagnosed (350) based on model assessment. If bad sub-models are detected (360), special process perturbation (370) is initiated to perturb relevant MVs and to subsequently collect resulting MVs and CVs data measurements. A new sub-model is identified/re-identified (380) using the subspace identification algorithm. The full model or conditioned sub-model(s) are uploaded (390) into the controller 110 to replace problematic submodels.

Figure 4:
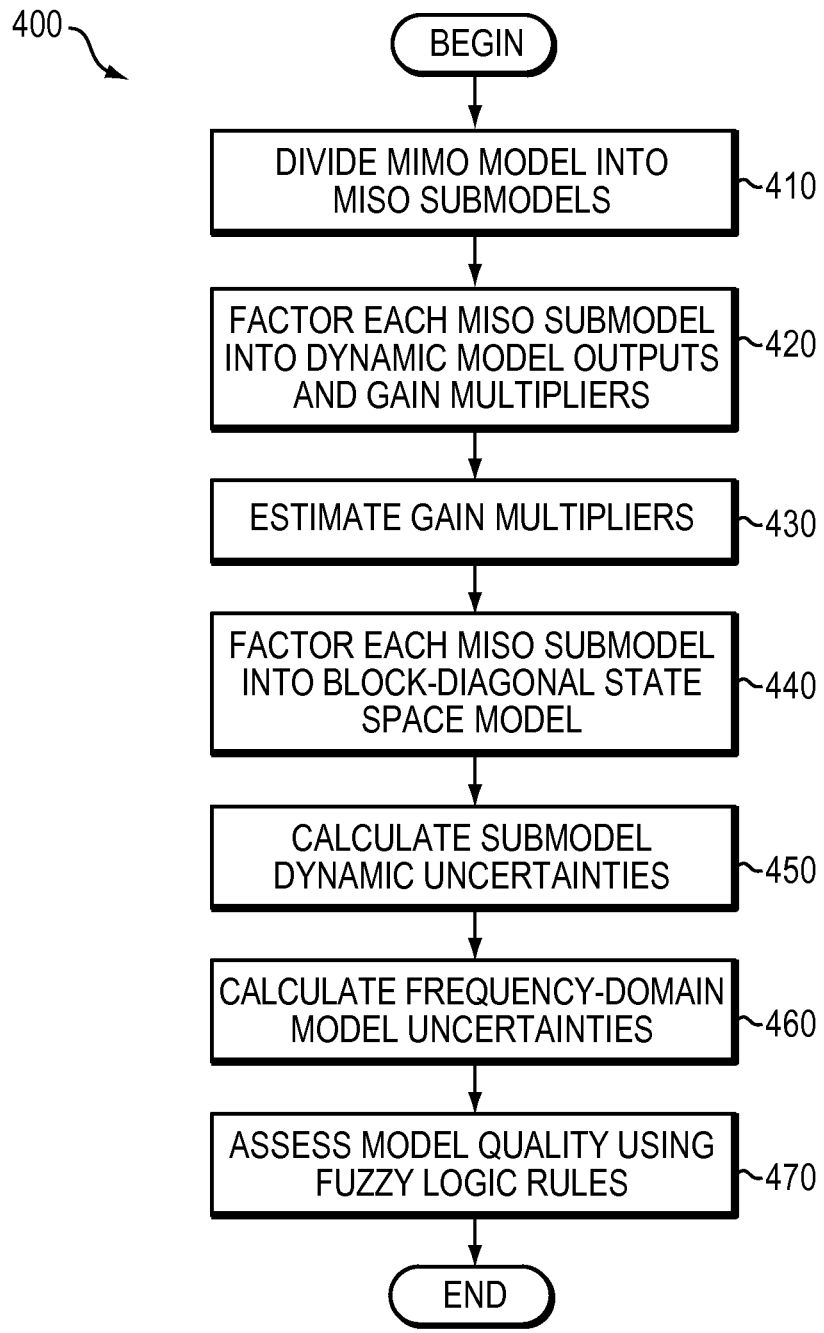
FIG. 4 is a flow diagram depicting model quality assessment according to an embodiment of the invention.

FIG. 4 is a flow diagram depicting model quality assessment according to an embodiment of the invention. After model quality assessment process 400 begins, the MIMO model is divided (410) into MISO submodels, each of which is factored (420) into dynamic model outputs and gain multipliers. The gain multipliers are estimated (430) from the collected and validated data of MVs and CVs. A MISO sub-model is further factored (440) into a MISO state space dynamical sub-model and a model dynamic uncertainty is defined and calculated (450) for each SISO submodel. In parallel, a frequency-domain model uncertainty for each SISO submodel is further calculated (460). The model quality assessment is then determined (470) by using fuzzy logic rules for combining scores as further detailed later.

Some embodiments include an automated data slicing device that includes a status converter that downloads all specified operational status information regarding the MVs, CVs and the MPC controller's 110 operational status and converts such status information into "data flags" associated with each MV, CV, or a group of MVs and/or CVs. In an embodiment, the data slicing device selects data segments by generating "good" or "bad" slices to prepare the required data for model auditing and identification. In an embodiment, the data slicing device also includes a data-conditioner that scans data gaps with continuous "missing" or "bad" data pieces and automatically fills in such gaps with interpolated values to enhance the efficient usage of auditing data. In an embodiment, the data slicing device also includes a configurable "event-driven" data slice generator, which automatically generates "bad-data" slices based on a configured "data-slicing" rule to exclude those bad data during a specified event period for model auditing and model identification.

A configurable "event-driven" data slice generator, which automatically generates "bad-data" slices based on configured "data-slicing" rule to exclude those data during a "event-period" for model auditing and model identification.

A process excitation examiner is a part of the automatic data slice generator, which further validates the data sufficiency in order to ensure a reliable and successful sub-model auditing and re-identification. A special method to evaluate the process excitation condition and data validity for model auditing includes calculating a special key performance indicator (KPI) of MVs' moves and their corresponding responses, as well as the cross-correlations among the data of MVs during certain time periods.

Figure 6:
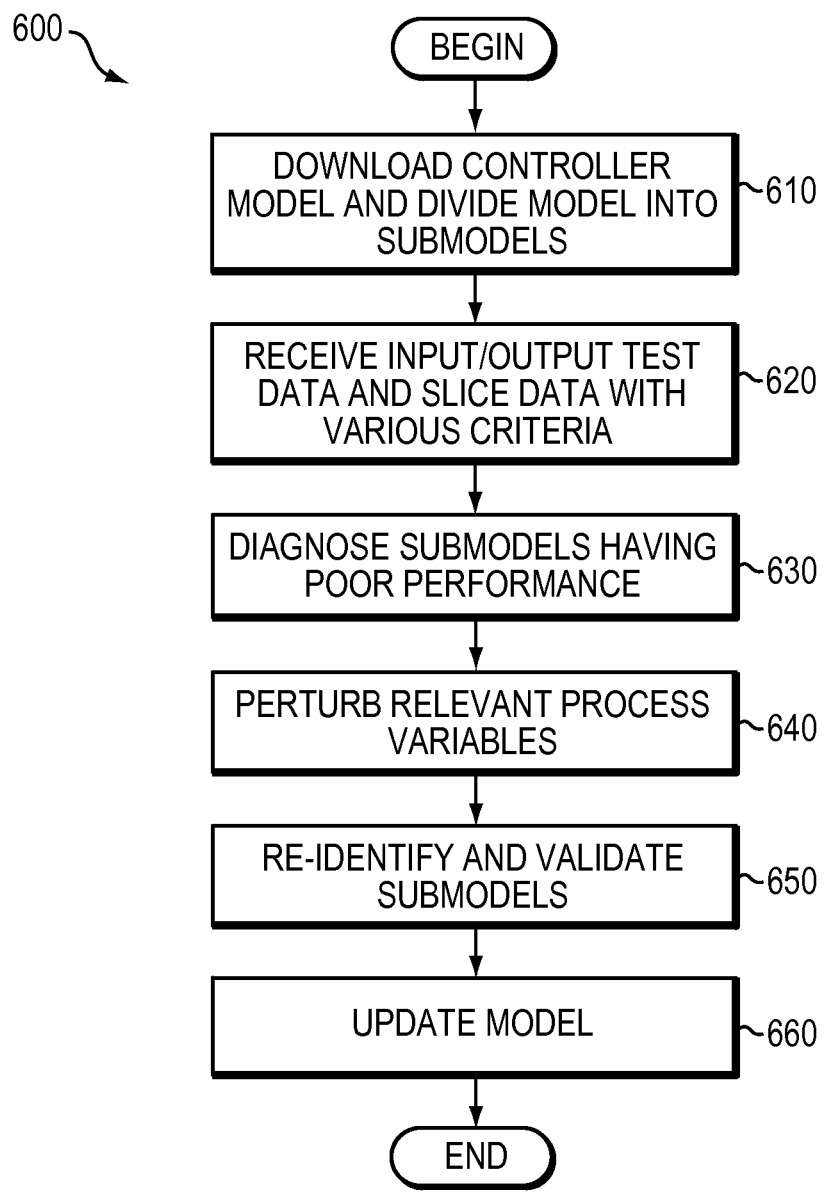
FIG. 6 is a flow diagram depicting poor performing/problematic submodel's diagnosis and re-identification according to an embodiment of the invention.

For non-limiting example, FIG. 6 is a flow diagram of submodel diagnosis and re-identification according to one embodiment. The process 600 begins by downloading the MPC controller model 110 and dividing the model into sub-models (step 610). Next, Step 620 receives input and output test data including MV's and CV measurements. Using this data, Step 620 automates data slicing based on various criteria, such as those discussed above.

In turn, Step 630 determines prediction performance of submodels and diagnoses the poorly performing submodels. For example, the above mentioned fuzzy logic techniques and rules (further detailed below) are used. In response, step 640 perturbs the relevant process variables, and step 650 re-identifies and validates submodels. Next Step 660 updates the controller 110 model accordingly.

In one embodiment, a method for structured multi-input multi-output (MIMO) subspace model identification is configured flexibly and run online. The MIMO subspace identification module includes optimal CV grouping and the use of structured prior information for the best efficiency of data usage. Data are pre-processed for the best signal/noise ratio. A MIMO identification problem is solved for each sub-model. A model's predictive performance is evaluated against identification data. The MIMO model is automatically assembled via model adaptation.

Gain Multiplier Estimation

Figure 2A:
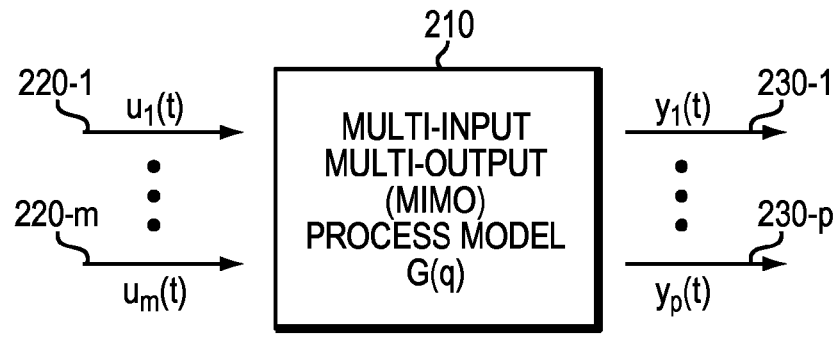
FIG. 2A is a block diagram of a multiple input multiple output (MIMO) process model.

FIG. 2A is a block diagram of a multiple input multiple output (MIMO) process model 210. Inputs U(t) (depicted as 220-1, ..., 220-m) and outputs Y(t) (depicted as 230-1, ..., 230-p) of the MIMO process are defined as follows:

$$U(t)=[u_1(t)u_2(t)\ldots u_m(t)]^T, Y(t)=[y(t)y_2(t)\ldots y_p(t)]^T;$$

The MIMO process 210 can be described by a linear dynamic model G(q) and process disturbance and measurement noise v(t):

$$Y(t) = G(q)U(t) + v(t) \quad (1)$$

$$= \begin{bmatrix} G_{11}(q) & G_{12}(q) & \ldots & G_{1m}(q) \\ G_{21}(q) & G_{22}(q) & \ldots & G_{2m}(q) \\ \vdots & \vdots & \vdots & \vdots \\ G_{p1}(q) & G_{p2}(q) & \ldots & G_{pm}(q) \end{bmatrix} \begin{bmatrix} u_1(t) \\ u_2(t) \\ \vdots \\ u_m(t) \end{bmatrix} + \begin{bmatrix} v_1(t) \\ v_2(t) \\ \vdots \\ v_m(t) \end{bmatrix}$$

For each output $y_i(t)$ (i=1, 2, ..., p), a corresponding multiple input single output (MISO) model is obtained:

$$y_i(t) = [G_{i1}(q) \quad G_{i2}(q) \quad \ldots \quad G_{im}(q)] \begin{bmatrix} u_1(t) \\ u_2(t) \\ \vdots \\ u_m(t) \end{bmatrix} + v_i(t) \quad (2)$$

$$(i = 1, 2, \ldots, p)$$

The term $v_i(t)$ represents process disturbance and measurement noise on the ith output, and the model predictions (estimates) are calculated as:

$$\hat{y}_i(t) = [\, G_{i1}(q) \quad G_{i2}(q) \quad \ldots \quad G_{im}(q)\,] \begin{bmatrix} u_1(t) \\ u_2(t) \\ \vdots \\ u_m(t) \end{bmatrix} \qquad (2A)$$

$$(i = 1, 2, \ldots, p)$$

Figure 2B:
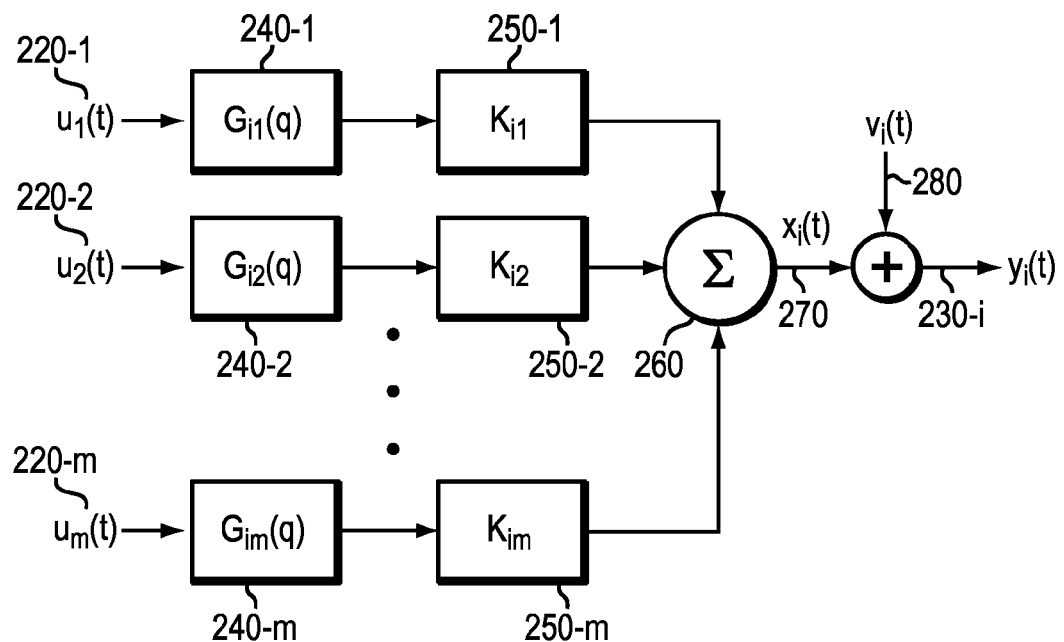
FIG. 2B is a block diagram of a multiple input single output (MISO) model with gain multipliers.

FIG. 2B is a block diagram of a multiple input single output (MISO) model with gain multipliers. A diagonal matrix K consisting of m gain multipliers is defined. Assuming that the model prediction error can be minimized by adjusting the gain multipliers, equation (2A) can be expanded as:

$$\hat{y}_i(t) = [\, G_{i1}(q) \quad G_{i2}(q) \quad \ldots \quad G_{im}(q)\,] \begin{bmatrix} K_{i1} & & & \\ & K_{i2} & & \\ & & \ddots & \\ & & & K_{im} \end{bmatrix} \begin{bmatrix} u_1(t) \\ u_2(t) \\ \vdots \\ u_m(t) \end{bmatrix}$$

$$= \sum_{j=1}^{m} K_{ij} G_{ij}(q) u_j(t) \qquad (2B)$$

$$(i = 1, 2, \ldots, p)$$

This representation is shown in FIG. 2B with submodels 240-1, ..., 240-m, gain multiplier terms 250-1, ..., 250-m, sum result 270 of summation 260, process disturbance and noise 280, and output 230-i. Output predictions are further defined from each input-output pair (i.e., each SISO prediction channel in FIG. 2B) as:

$$x_{ij}(t) = G_{ij}(q) u_j(t) \qquad (3)$$

Then, equation (2B) can be rewritten as:

$$\hat{y}_i(t) = \sum_{j=1}^{m} K_{ij} x_{ij}(t) = [\, x_{i1}(t) \quad x_{i2}(t) \quad \ldots \quad x_{im}(t)\,] \begin{bmatrix} K_{i1} \\ K_{i2} \\ \vdots \\ K_{im} \end{bmatrix} = x_i^T(t) K_i \qquad (2C)$$

For given data samples $Z^N = \{y_i(t), x_i(t)\}$ (t=1, 2, ..., N), data vector $y_i$ and data matrix $X_i$, are constructed, yielding:

$$\begin{bmatrix} y_i(1) \\ y_i(2) \\ \vdots \\ y_i(N) \end{bmatrix} = \begin{bmatrix} x_{i1}(1) & x_{i2}(1) & \ldots & x_{im}(1) \\ x_{i1}(2) & x_{i2}(2) & \ldots & x_{im}(2) \\ \vdots & \vdots & \ddots & \vdots \\ x_{i1}(N) & x_{i2}(N) & \ldots & x_{im}(N) \end{bmatrix} \begin{bmatrix} K_{i1} \\ K_{i2} \\ \vdots \\ K_{im} \end{bmatrix} + \begin{bmatrix} v_i(1) \\ v_i(2) \\ \vdots \\ v_i(N) \end{bmatrix} \qquad (2D)$$

Or in matrix expression:

$$y_i = X_i K_i + v_i \qquad (2D)$$

Here, $v_i = [v_i(1) \; v_i(2) \; \ldots \; v_i(N)]^T$ is the disturbance and measurement noise. It is desired to minimize the objective function $$\min_{K_i} J(Z^N, K_i) = \min_{K_i}(v_i^T v_i) = \min_{K_i} \sum_{t=1}^{N} v_i(t)^2 \qquad (4)$$

The least-squares (LS) estimate of gain multiplier vector $K_i$ is given by:

$$\hat{K}_i^{LS} = (X_i^T X_i)^{-1} X_i^T y_i \qquad (5)$$

The estimate's quality can be measured based on least-squares estimation theory by:

$$\lim_{N \to \infty}(\hat{K}_i^{LS} - K_i) = \lim_{N \to \infty}((X_i^T X_i)^{-1} X_i^T v_i) \qquad (6)$$

when the following conditions are satisfied:

$$\lim_{N \to \infty}(X_i^T X_i)^{-1} \neq 0 \qquad (1)$$

i.e. $(X_i^T X_i)$ is non-singular;

$$\lim_{N \to \infty}(X_i^T v_i) = 0 \qquad (2)$$

this will be the case if either:

a) $\{v_i(t)\}$ is a sequence of independent random variables with zero mean values, i.e. a white noise; or
b) The sequence $\{x_i(t)\}$ is independent of $\{v_i(t)\}$.

The LS estimate of equation (5) above is unbiased in an embodiment.

In the general case, the process disturbance $v_i$ is not white noise and the LS estimation (5) may be biased. To overcome this bias, the following two strategies are used:

Strategy-1: Two-Step Approach
(1) Calculate an initial LS estimate of the gain multipliers by estimation equation (5);
(2) Obtain prediction residuals $\{v_i(t)\}$ by use of equation (2D): $v_i = y_i - X_i \hat{K}_i^{LS}$
(3) Build a high-order Auto-Regressive (AR) model for disturbance $\{v_i(t)\}$: $D_n(q) v_i(t) = e(t)$ or $$v_i(t) = \frac{1}{D_n(q)} e(t) \qquad (7)$$

where $D_n(q)$ is a polynomial of order n (i.e. $v_i(t)$ is supposed to be an autoregressive (AR) process of order n), q is a forward shift operator, e.g. q e(t)=e(t+1); e(t) is a white noise (a sequence of independent random variables with zero-mean values);
(4) Define a stable filter $F(q) = D_n(q)$ and apply it to equation (2) via relation (3):

$$\tilde{y} = \tilde{X}_i K_i + e_i \qquad (2E)$$

where the elements of $\tilde{y}_i$ and $\tilde{X}_i$ are filtered outputs and calculated quantities:

$$\tilde{y}_i(t) = F(q) y_i(t), \tilde{x}_{ij}(t) = F(q) x_{ij}(t) = G_{ij}(q) F(q) u_j(t) = G_{ij}(q) \tilde{u}_j(t) \qquad (8)$$

(5) Re-estimate $K_i$ with filtered data, an unbiased LS estimation can be obtained as $$\hat{K}_i^{LS}=(\tilde{X}_i^T\tilde{X}_i)^{-1}\tilde{X}_i^T\tilde{y}_i \tag{5A}$$

because $$\lim_{N\to\infty}(\tilde{X}_i^T e_i)=0$$

as $e_i$ is white noise.

Strategy-2: Pre-Process Input and Output Data

In the discussion above regarding the conditions that need to be satisfied to achieve unbiased LS estimation of the gain multipliers, Strategy-1 employs conditions (1) and (2) a). Strategy-2 described here will satisfy conditions (1) and (2) b) by preprocessing input data with simple differencing.

In an embodiment, if test data are generated in a Test Mode, and the process input signals are generated with a magnitude Modulated Generalized Binary Noise (MGBN) generator by use of automated closed loop step testing techniques described in Magiel J. Harmse and Qingsheng Zheng, "Automated closed loop step testing of process units," U.S. Pat. No. 7,209,793, by assignee, the contents of which are incorporated herein by reference in their entirety.

Figure 5A:
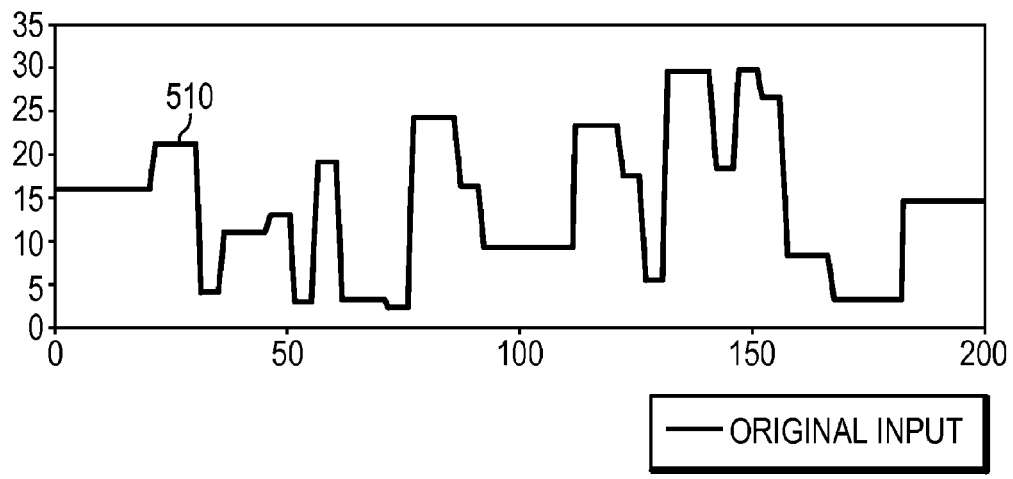
FIG. 5A is a signal trace of an input signal according to an embodiment of the invention.
Figure 5B:
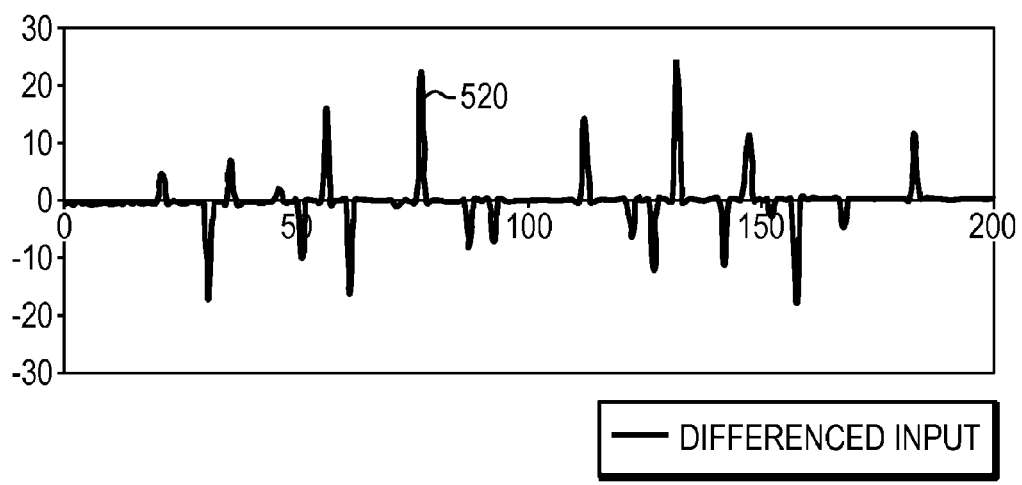
FIG. 5B is a signal trace of a differenced input signal according to an embodiment of the invention.

FIGS. 5A-B show an example of the MGBN signal over 3 hrs. In FIG. 5A, the MGBN test signal sequence 510 is plotted. The sequence 510 consists of a number of random up and down step moves, some held for a short time while others are held for a longer time. The sequence is a kind of "pseudo" white noise sequence.

A differencing operator is applied to both input and output data:

$$\tilde{u}_j(t)=\Delta u_j(t)=(1-q^{-1})u_j(t)=u_j(t)-u_j(t-1) \tag{9A}$$

$$\tilde{y}_i(t)=\Delta y^i(t)=(1-q^{-1})y_i(t)=y_i(t)-y_i(t-1) \tag{9B}$$

Then, Eq. (3) can be modified as $$\tilde{x}_{ij}(t)=G_{ij}(q)\tilde{u}_j(t) \tag{3A}$$

In an embodiment in which the underlying MPC controller 110 uses a Finite Impose Response (FIR) model, $\{\tilde{x}_{ij}(t)\}$ is solely dependent on the input sequence $\{\tilde{u}_j(t)\}$.

If the FIR model is given, there is no recurrent $\{\tilde{x}_{ij}(t)\}$ that is correlated with disturbance $\{v_j(t)\}$. Therefore, the $\{\tilde{x}_{ij}(t)\}$ is uncorrelated with the disturbance $\{v_j(t)\}$. In system identification theory, the $\{\tilde{x}_{ij}(t)\}$ is one kind of "Instrumental Variable", which can be used in parameter estimation to lead to an unbiased estimation if the input sequence $\{\tilde{u}_j(t)\}$ is close to white noise and the $\{\tilde{x}_{ij}(t)\}$ is an ideal instrumental variable.

FIG. 5B shows the plot of $\{\tilde{u}_j(t)\}$, i.e. the "preprocessed" input test signal of $\{u_j(t)\}$ with "differencing" 520. The plot 520 in FIG. 5B is closer to a white noise than its "original" signal because the differenced signal is a sequence of random impulses. Meanwhile, applying "differencing" to both input and output data, it is equivalent to use an autoregressive integrated moving average (ARIMA) model structure, in which all unknown slow disturbances that are often seen in process output data, such as drifts, trends, and cyclic re-cycles will be removed. In addition, for each individual MISO submodel, some of the MVs may not be perturbed during auditing or a testing period; applying "differencing" allows automatic exclusion of those MVs in model auditing and model re-identification and as a result, the negative impacts from those "missing inputs" can be minimized.

As a result, it follows that $$\lim_{N\to\infty}(\tilde{X}_i^T v_i)\approx 0$$

as the $\{\tilde{x}_{ij}(t)\}$ is uncorrelated with the disturbance $\{v_j(t)\}$, and the unbiased LS estimate is obtained:

$$\hat{K}_i^{LS}=(\tilde{X}_i^T\tilde{X}_i)^{-1}\tilde{X}_i^T\tilde{y}_i \tag{10}$$

Submodel's Dynamic Uncertainty Calculation

The Gain Multiplier Estimation method described above is effective in detecting the changes/degradation of a submodel's steady-state gain. However, if the underneath process change/degradation involves significant shift in its dynamics, such as a significant change in the dead time and response time, using Gain Multiplier Estimation alone may not be able to capture all the information one needs for a conclusive model auditing.

Consider the ith MISO submodel (2), instead of factoring it into a product of sub-models and a gain multiplier vector (as described in (2B), re-formulate each SISO sub-model with a state space model format and re-arrange all the SISO sub-models in an block-diagonal form as shown below:

$$x(t+1)=Ax(t)+Bu(t) \tag{11}$$

$$=\begin{bmatrix} A_{i1} & 0 & \cdots & 0 \\ 0 & A_{i2} & \cdots & 0 \\ \vdots & \ddots & \ddots & \vdots \\ 0 & \cdots & 0 & A_{im} \end{bmatrix}\begin{bmatrix} x_1(t) \\ x_2(t) \\ \vdots \\ x_n(t) \end{bmatrix}+\begin{bmatrix} b_{i1} & 0 & \cdots & 0 \\ 0 & b_{i2} & 0 & \vdots \\ \vdots & 0 & \ddots & 0 \\ 0 & \cdots & 0 & b_{im} \end{bmatrix}\begin{bmatrix} u_1(t) \\ u_2(t) \\ \vdots \\ u_m(t) \end{bmatrix}$$

$$y_i(t)=Cx(t)=[c_{i1}\ c_{i2}\ \cdots\ c_{im}]\begin{bmatrix} x_1(t) \\ x_2(t) \\ \vdots \\ x_n(t) \end{bmatrix} \tag{12}$$

where the state vector $x(t)$ holds model's dynamic information, and matrixes $\{A_{ij}, b_{ij}, c_{ij}\}$ determine each SISO submodel's dynamic responses.

An embodiment of the invention includes the following algorithm with the model representation (11) and (12):

(1) Download the process model from the MPC controller 110. A typical model consists of (p×m) SISO FIR curves, but it is not limited to FIR model formats;

(2) For each SISO submodel, convert its FIR curve (or a SISO model in other format) into a state space model $\{A_{ij}, b_{ij}, c_{ij}\}$ via state space realization method that may include, but is not limited to, state space minimum realization and model reduction;

(3) Combine each SISO state space model that was generated in step (2) to form a MISO model for each CV in a format of equations (11) and (12);

(4) Feed validated inputs data of MVs into equation (11) and generate data of state variables $\{x(t)\}$ from simulation with equation (11);

(5) Using measurement data $\{y(t)\}$ and simulated data of state variables $\{x(t)\}$, do a Least Square (LS) regression of equation (12) to re-estimate the matrix C as following:

$$\hat{C}_{LS}=(XX^T)^{-1}XY^T \tag{13}$$

where X and Y represent simulated state variable data and measured CV data respectively $$X=[x(1)x(2)\ldots x(N)]$$

$$Y=[y_i(1)y_i(2)\ldots y_i(N)]$$

(6) Generate a set of new FIR model curves by using the re-estimated matrix $\hat{C}_{LS}$ and equation (11) with $u_j(t)=1(t)$ for the jth input to ith output, i.e.

$$x(t+1)=Ax(t)+b_{ij}u_j(t)$$

$$h_j=\hat{C}_{LS}x(t) \tag{12A}$$

(7) Define a new measure of model's dynamic uncertainty as:

$$J(h_i, h_{i0}, \hat{K}_i) = \sum_{t=1}^{TTSS} (h_i(t) - h_{i0}(t) \times \hat{K}_{ij})^2 \tag{13}$$

where $h_i$, $h_{i0}$ are FIR coefficients vector and $K_i$ is the gain multiplier estimate calculated in equation (5) or (5A); the value $J(h_i, h_{i0}, K_i)$ represents an accumulated deviation due to the model's change in dynamics;

(8) An assessment of the submodel's dynamic degradation is then carried out based on the following criterion:
  a. Good, if $J(h_i, h_{i0}, K_i)<\epsilon$;
  b. Fair, if $\epsilon<J(h_i, h_{i0}, K_i)<2\epsilon$;
  c. Poor, if $2\epsilon<J(h_i, h_{i0}, K_i)<3\epsilon$;
  d. Bad, if $J(h_i, h_{i0}, K_i)>3\epsilon$;

where $\epsilon$ is an adjustable threshold with a default value of $[(h_{i0}(TTSS)\times 5\%)^2/TTSS]$.

Frequency-Domain Model Uncertainty Calculation

To further evaluate a model's predictive quality, in addition to a check on the model's steady-state gain via the gain multiplier estimation and the Dynamic Uncertainty described above, the model's overall properties are further assessed by calculating its frequency-domain asymptotic variance and the model's relative uncertainty.

Re-considering MIMO system (1) and its sub-model MISO system (2), for such a general linear dynamic system, it is known that the model in the time domain has a corresponding counterpart in frequency domain as follows:

$$y(t)=G(q)u(t)+v(t) \text{ where } v(t)=H(q)e(t)$$

$v(t)$–disturbance, $e(t)$–white noise;

and its frequency domain map is $$Y(t)=G(z^{-1})U(t)+v(t) \Leftrightarrow Y(\omega)=G(e^{-j\omega})U(\omega)+H(e^{-j\omega})w(\omega) \tag{11}$$

where the $G(e^{-j\omega})$ is the model's frequency representation.

According to (Lennart Ljung, System Identification: Theory for Users, Second Edition, Prentice-Hall, Upper Saddle River, N.J. 07458, 1999), the following result about asymptotic variance of the transfer function holds when model order n approaches infinity as N approaches infinity.

If we define: $\text{Cov } \hat{G}(e^{j\omega})=E|\hat{G}(e^{j\omega})-E\hat{G}(e^{j\omega})|^2$
then we have $$\text{Cov}\begin{bmatrix}\hat{G}(e^{j\omega})\\\hat{H}(e^{j\omega})\end{bmatrix} \approx \frac{n}{N}\Phi_v(\omega)\begin{bmatrix}\Phi_u(\omega) & \Phi_{eu}(\omega)\\\Phi_{ue}(\omega) & R\end{bmatrix}^{-1} \tag{12}$$

In the open loop case, $\Phi_{ue}(\omega)=0$, and the result is further simplified as:

$$\text{Cov}\hat{G}(e^{j\omega}) \approx \frac{n}{N}\frac{\Phi_v(\omega)}{\Phi_u(\omega)} \tag{12A}$$

In the closed loop case, a similar result can be obtained based on (Forssell and Ljung, Closed-loop identification revisited. Automatica. v35 i7. 1215-1241. 1999.):

$$\text{Cov}\hat{G}(e^{j\omega}) \approx \frac{n}{N}\Phi_v(\omega)\frac{R}{R\Phi_u(\omega)-|\Phi_{ue}(\omega)|^2} = \tag{12B}$$

$$\frac{n}{N}\frac{\Phi_v(\omega)}{|S_0|^2\Phi_r(\omega)} = \frac{n}{N}\frac{\Phi_v(\omega)}{\Phi_u^r(\omega)}$$

where $|S_0|^2 = \frac{1}{|1+G(\omega)C(\omega)|^2} < 1$, $C(\omega)$ is controller's transfer function The perturbation signals (external inputs) $r_j(t)$ (j=1, 2, ... m) are available from automated closed-loop testing technology, and the disturbance $v_i(t)$ (i=1, 2, ..., p) can be calculated by Eq. (2). Therefore, a quantitative model uncertainty for each SISO sub-model is obtained by calculating the model error bound:

$$|G_{ij}^o(e^{j\omega}) - \hat{G}_{ij}^N(e^{j\omega})| \leq 3\sqrt{\frac{n}{N}[(\Phi_u^r(\omega))^{-1}]_{jj}\Phi_{v_i}(\omega)} \quad w.p. \; 99.9\% \tag{13}$$

In practice, we are more interested in the maximum model errors in two specific frequency points at $\omega=0$, and $\omega=\omega_T$, i.e. the model's uncertainty at its steady-state gain and at the dominate dynamics, i.e.

$$\sigma(0) = \sqrt{\frac{n}{N}[(\Phi_u^r(0))^{-1}]_{jj}\Phi_{v_i}(0)} \quad \text{(variance for steady-state gain)} \tag{13A}$$

$$\sigma(\omega_T) = \tag{13B}$$
$$\sqrt{\frac{n}{N}[(\Phi_u^r(\omega_T))^{-1}]_{jj}\Phi_{v_i}(\omega_T)} \quad \text{(variance for major dynamics)}$$

The model's dynamic predictive quality is then assessed by a comparison between the magnitude of the model and the model errors.

Overall Model Predictive Quality Assessment Using Fuzzy Logic

Fuzzy Logic is a problem-solving methodology that provides a simply way to arrive at a definite conclusion based on vague, ambiguous, imprecise, noisy, or missing input information. Fuzzy logic's approach mimics how a person would make decisions based on his experiences and inference. As the model's gain multipliers, a measure of dynamic uncertainty and model's frequency-domain model errors have been calculated independently, an overall model predictive quality can be assessed with the following fuzzy logic table and rules.

Define the following fuzzy sets in Table 1:

TABLE 1

Fuzzy Logic Sets

| Condition Values | Good (G) | Fair (F) | Poor (P) | Bad (B) |
|---|---|---|---|---|
| Gain Multiplier $K_{ij}$ | $\|K_{ij} - 1\| \leq 0.3$ | $0.3 < \|K_{ij} - 1\| \leq 0.5$ | $0.5 < \|K_{ij} - 1\| \leq 1.0$ | $\|K_{ij} - 1\| > 1.0$ |
| Dynamic Model Uncertainty $J(h_i, h_{i0}, K_i)$ | $J(h_i, h_{i0}, K_i) < \epsilon$ | $\epsilon < J(h_i, h_{i0}, K_i) < 2\epsilon$ | $2\epsilon < J(h_i, h_{i0}, K_i) < 3\epsilon$ | $J(h_i, h_{i0}, K_i) > 3\epsilon$ |
| Steady-State Gain Uncertainty $\sigma(0)$ | $3\sigma(0) \leq \frac{1}{2}\|G(0)\|$ | $\frac{1}{2}\|G(0)\| < 3\sigma(0) \leq \|G(0)\|$ | $3\sigma(0) \geq \|G(0)\|$ and $3\sigma(0) < 2\|G(0)\|$ | $3\sigma(0) \geq 2\|G(0)\|$ |
| Major Dynamic Model Uncertainty $\sigma(\omega_T)$ | $3\sigma(\omega_T) \leq \frac{1}{2}\|G(\omega_T)\|$ | $\frac{1}{2}\|G(\omega_T)\| < 3\sigma(\omega_T) \leq \|G(\omega_T)\|$ | $3\sigma(\omega_T) \geq \|G(\omega_T)\|$ and $3\sigma(\omega_T) < 2\|G(\omega_T)\|$ | $3\sigma(\omega_T) \geq 2\|G(\omega_T)\|$ |

Define the following (changeable) Fuzzy Rule Structures and Rule Matrixes:

1. A SISO submodel's Steady-State Gain Evaluation:

| Quality 1 | Outputs | Gain Multiplier $K_{ij}$ | | | | |
|---|---|---|---|---|---|---|
| | | Good (G) | Fair (F) | Poor (P) | Bad (B) | Unavailable (U) |
| Steady-State Gain Uncertainty $\sigma(0)$ | Good (G) | G | G | F | P | G |
| | Fair (F) | G | F | P | B | F |
| | Poor (P) | F | P | P | B | P |
| | Bad (B) | P | P | B | B | B |
| | Unavailable (U) | G | F | P | B | U |

2. A SISO submodel's Dynamic Evaluation:

| Quality 2 | Outputs | Dynamic Model Uncertainty $J(h_i, h_{i0}, K_i)$ | | | | |
|---|---|---|---|---|---|---|
| | | Good (G) | Fair (F) | Poor (P) | Bad (B) | Unavailable (U) |
| Major Dynamic Model Uncertainty $\sigma(\omega_T)$ | Good (G) | G | G | F | P | G |
| | Fair (F) | G | F | P | B | F |
| | Poor (P) | F | P | P | B | P |
| | Bad (B) | P | P | B | B | B |
| | Unavailable (U) | G | F | P | B | U |

3. A SISO submodel's Overall Evaluation:

| | | Overall Quality Assessment Quality 1 (Steady-State Gain) | | | | |
|---|---|---|---|---|---|---|
| | Outputs | Good (G) | Fair (F) | Poor (P) | Bad (B) | Unavailable (U) |
| Quality 2 (Dynamic Uncertainty) | Good (G) | G | F | F | P | G |
| | Fair (F) | G | F | P | B | F |
| | Poor (P) | F | F | P | B | P |
| | Bad (B) | P | P | B | B | B |
| | Unavailable (U) | G | F | P | P | U |

Apply the fuzzy rules listed in Quality1, a submodel's steady-state predictive quality assessment can be obtained. For example:
IF ($K_{ij}$) IS "Good" AND ($\sigma(0)$) IS "Good", THEN Model Quality 1="Good";
IF ($K_{ij}$) IS "Fair" AND ($\sigma(0)$) IS "Good", THEN Model Quality 1="Good";
IF ($K_{ij}$) IS "Good" AND ($\sigma(0)$) IS "Fair", THEN Model Quality 1="Good";
...
IF ($K_{ij}$) IS "Poor" AND ($\sigma(0)$) IS "Poor", THEN Model Quality 1="Poor";
IF ($K_{ij}$) IS "Bad" AND ($\sigma(0)$) IS "Fair", THEN Model Quality 1="Bad";
...

Apply the fuzzy rules listed in Quality2, a submodel's dynamic predictive quality assessment may be obtained. For example:
IF ($J(h_i, h_{i0}, K_i)$) IS "Good" AND $\sigma(\omega_T)$ IS "Good", THEN Model Quality2="Good";
IF ($J(h_i, h_{i0}, K_i)$) IS "Good" AND $\sigma(\omega_T)$ IS "Fair", THEN Model Quality2="Good";
IF ($J(h_i, h_{i0}, K_i)$) IS "Poor" AND $\sigma(\omega_T)$ IS "Fair", THEN Model Quality2="Poor";
IF ($J(h_i, h_{i0}, K_i)$) IS "Bad" AND $\sigma(\omega_T)$ IS "Fair", THEN Model Quality2="Bad";
...

In a similar pattern, the overall model's quality may be concluded according to Fuzzy Rule Matrix 3. For example:
IF (Quality1) IS "Good" AND (Quality2) IS "Good", THEN Model Quality="Good";
IF (Quality1) IS "Fair" AND (Quality2) IS "Good", THEN Model Quality="Fair";
IF (Quality1) IS "Good" AND (Quality2) IS "Fair", THEN Model Quality1="Good";
...

In the embodiment, the Fuzzy Logic Rule Matrix may be editable according to the operator and engineer's knowledge, as a Fuzzy-Logic system is a simple implementation of an expert system.

The overall Model Quality results for each submodels are displayed in the user interface with five different colors in a non-limiting example embodiment:
Green="Good";
Blue="Fair",
Orange="Poor",
Red="Bad",
Grey="Unknown".

Figure 8:
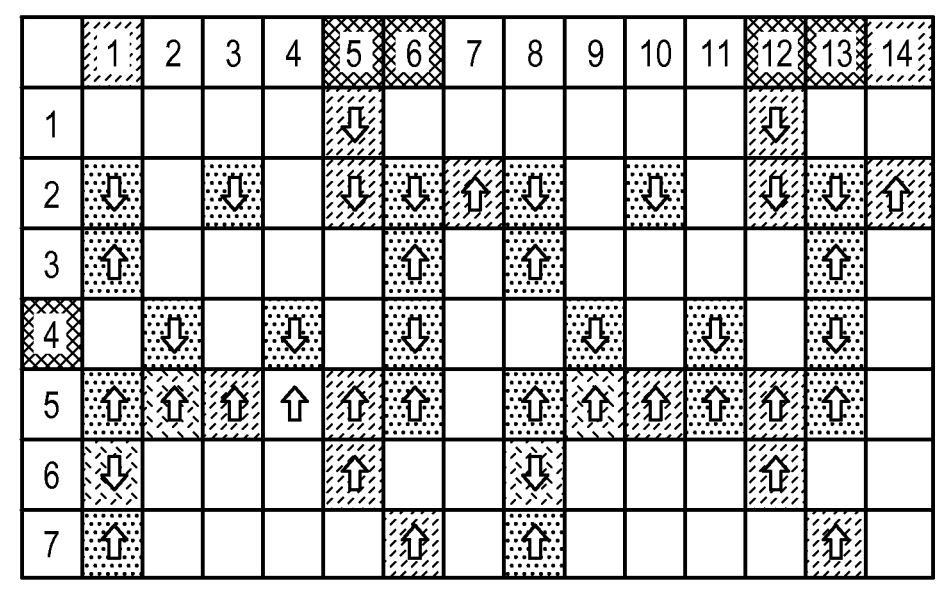

FIG. 8 is illustrative. The presented Model Quality KPI (key performance indicator) carpet plot displays an example Model Quality assessment result. In the illustrated plot, each row represents a MV and each column represents a CV, and each cell represents a SISO submodel corresponding to the respective MV-CV pair. Inside the Model KPI Plot, each cell's color is determined by the associated model quality assessment results (Good, Fair, Poor, Bad, and Unknown). The arrows represent the gain directions of each SISO submodel. For instance, a submodel with positive gain has an upward arrow; a submodel with negative gain has a downward arrow.

Advantages over Conventional Approaches

Generally speaking, the current practice in this area mainly relies on the expertise of MPC application engineers. There are a few references Galarza et al., "Method for Automated System Identification", U.S. Pat. No. 6,947,876 B1, Sep. 20, 2005, Yucai Zhu, "Computer Method and Apparatus for Online Process Identification", Patent Application Publication No. US2006/0111858 A1, May 25, 2006, and Yucai Zhu, "Computer Method and Apparatus for Adaptive Model Predictive Control", Patent Application Publication No. US2007/0225835 A1, Sep. 27, 2007 that claimed some ideas and approaches to address a similar problem. Embodiments of the present invention have many advantages over such references by use of unique and innovative techniques. The present invention apparatus and method for MPC model auditing and adapting is an expansion and integration of the existing approach by previously cited Harmse, et al. U.S. Pat. No. 7,209,793 into the online MPC controller 110. This integration keeps a better balance between perturbing the process for informative data and maintaining the process running safely. Therefore, embodiments can be online and applied regularly for sustained value purposes. In contrast, in (Galarza et al., 2005), (Zhu, 2006), and (Zhu, 2007), each cited above, the test signals were designed and generated based on system identification requirements and were less concerned with the process operation limits imposed on the MPC controller for operational safety and stability.

The major advantage of the invention/Applicant's presented new apparatus and method lies in its lower requirement on the data quality. Unlike in a full-blown system identification as discussed in the cited publications and patents, where a systematic process perturbantion is needed to meet the data requirement, the present invention system/algorithm may use less perturbing and some existing operation data with a carefully designed data slicing mechanism employed.

Embodiments include an automated data slicing and selection module that maximally converts historical operation information of an underlying MPC controller 110 into data selection rules and logistics and applies those rules to support automatic data segment selection. In such a way, the selected process data will be qualified to be used for model assessment and model re-identification. This kind of task normally must be performed manually by MPC practitioners according to conventional techniques. Such manual operation is costly and very time-consuming. It is usually difficult to fully and optimally use all the historical information by such manual operations.

Embodiments include a structured model performance assessment engine and submodel identification that take full advantage of the existing model from the underlying MPC controller 110 and other prior knowledge to reduce the uncertainty of the model and hence generate high fidelity models with less data. Using conventional techniques, a re-test on all related process MVs is typically performed, and a full MISO or MIMO model is re-identified. Embodiments provide a "shortcut" through use of the model from the on-line MPC controller as a "blueprinting" initial model.

An embodiment of the invention include an automated workflow and provides a systematic and integrated so-called "Best Advanced Process Control Practice" solution to serve the process industry for easy monitoring and optimal MPC sustained economic performance.

Figure 7:
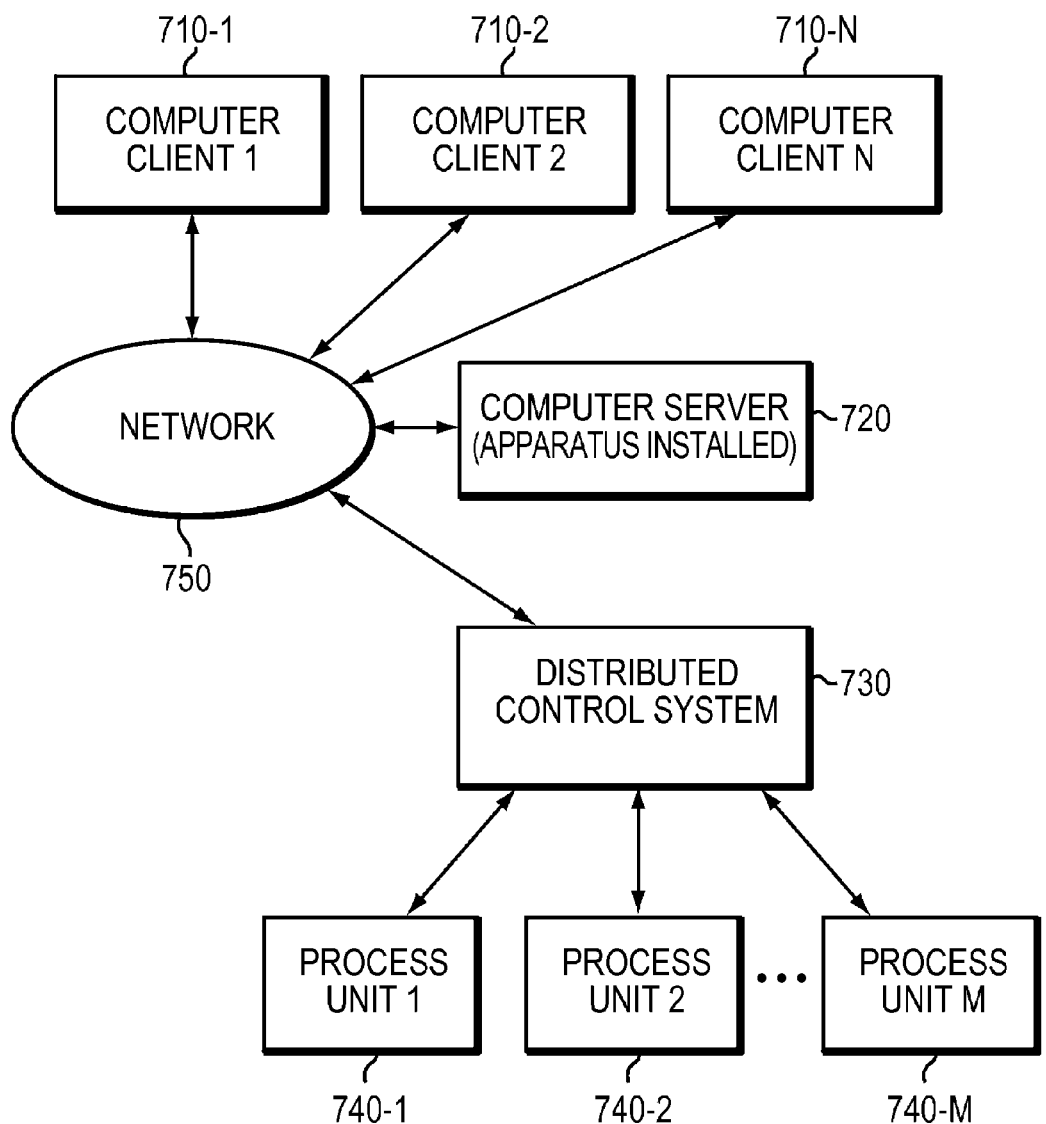
FIG. 7 is a computer network environment in which embodiments of the invention are implemented to serve one or more process units.

FIG. 7 illustrates a computer network and client-server environment in which the present invention may be implemented.

Client computer(s)/devices (710) and server computer(s) (720) provide processing, storage, and input/output devices executing application programs and the like. Typically, the present invention is installed as an apparatus in server computer (720). The server computer (720) and client computer(s)/devices(710) can be linked through communications network (750) to other computing devices, including other client devices/processes (710-*i*) and Distributed Control System (DCS) 730. Communications network (750) can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

An example of implementation of the present invention may be as shown in FIG. 7 where the DCS system 730 controls one or more process units 740. An apparatus and method (e.g., process/modules 300, 400, 600) described above is installed to run in the server computer 720. A user may access the server application from one or more client computers 710 that allow a remote connection through security and firewall in the network (750). A user may view, manage, change operations of one or more process units 740 through the DCS system 730. The described application may be configured by user from one or more client computers (710) and run in the server computer (720).

The present invention may be implemented in a variety of computer architectures. The computer network system 700 of FIG. 7 is for purposes of illustration and not limitation of the present invention.

Server computer 720 includes memory, a CPU (central processing unit) and the like. Memory provides volatile storage for computer software instructions and data used to implement an embodiment of the present invention (e.g., the controller 110, data validation and model adaptation 300, model assessment 400, and submodel diagnosis and re-identification process 600 as described above). Disk storage provides non-volatile storage for computer software instructions and data used to implement an embodiment of the present invention. The central processor unit provides for the execution of computer instructions. In one embodiment, the processor routines and data are a computer program product, including a computer readable medium (e.g., a removable storage medium such as one or more DVD-ROM's, CD-ROM's, diskettes, tapes, etc.) that provides at least a portion of the software instructions for the invention system. The computer program product can be installed by any suitable software installation procedure, as is well known in the art. In another embodiment, at least a portion of the invention software instructions may also be downloaded over a cable, communication and/or wireless connection or operable through a network portal.

While this invention has been particularly shown and described with references to example embodiments thereof, it will be understood by those skilled in the art that various changes in form and details may be made therein without departing from the scope of the invention encompassed by the appended claims.

What is claimed is:

1. A computer implemented method for on-line auditing and updating a multiple input multiple output (MIMO) dynamical model of a process, the method comprising:
given a hardware processor implementing an online controller having an existing dynamical model of the process, in a computer:
a. Using the existing dynamical model in the online controller as initial model to configure a tester;
b. Perturbing process variables of the process;
c. Collecting and slicing process data;
d. Estimating the model quality and identifying poor performing submodels of the dynamical model, the estimating and identifying comprising:
dividing the MIMO dynamical model into a plurality of multiple input single output (MISO) submodels,
factoring each MISO submodel into single input single output (SISO) dynamic model outputs and associated gain multipliers resulting in one or more factored SISO submodels,
estimating the gain multipliers from the collected process data by use of a gain multiplier estimation algorithm,
for each factored SISO submodel, calculating a respective dynamic model uncertainty by use of a dynamic uncertainty estimation algorithm,
for each factored SISO submodel, calculating a respective frequency-domain uncertainty by use of an asymptotic variance algorithm,
assessing overall quality of each submodel of the dynamical model by use of a set of fuzzy logic rules based on the factored SISO submodels, and
identifying poor-performing submodels of the dynamical model based on the overall quality assessment;
e. Further perturbing the process variables relevant to the identified poor performing submodels;
f. Re-identifying those poor performing submodels, resulting in newly identified submodels;
g. Updating the online controller model with the newly identified submodels, wherein model update is performed online, with the process continuing to operate within normal operating parameters of the process, and said updating resulting in an improved model for the online controller.

2. The method of claim 1, further comprising:
providing an MPC controller; and
repeating steps (a) through (g) with said improved model until all submodels of the dynamical model in the online controller meet a certain overall quality level with the MPC controller.

3. The method of claim 1, wherein the configured tester is an automatic closed-loop tester; and
further including integrating an MPC controller and the automatic closed-loop tester in a manner such that automated testing is further improved.

4. The method of claim 3, wherein the MPC controller and tester is able to run in either MPC control mode or automated step testing mode while maintaining the process variables within their pre-defined operating constraints.

5. The method of claim 3, wherein the tester employs the existing dynamical model in the online controller as an initial model to configure a model auditing scheme.

6. The method of claim 5, wherein the model auditing scheme can be executed automatically based on a configurable scheduler or be executed on demand manually.

7. The method of claim 3, wherein the process variables are automatically perturbed using a generalized binary noise signal to generate informative process data for model auditing and model identification.

8. The method of claim 1, further comprising automatically collecting process operation data under perturbing or control.

9. The method of claim 8, wherein automatically collecting data are performed at a user specified time period and a user specified sampling frequency.

10. The method of claim 1, further including screening and validating the collected data by using variable measurement status and the controller or tester calculated status of process variables.

11. The method of claim 10, wherein screening and validating the data includes the use of data processing logistics to find out those segments with any of missing data, frozen in value, out of limits, and data recording errors.

12. The method of claim 1, further comprising automated data validation to satisfy requirements in model auditing and model re-identification.

13. The method of claim 12, wherein the data validation includes any of slicing out data segments without sensible variations in a manipulated variable (MV) and slicing out data segments with high cross-correlation among MVs, both being based on certain MV moves detection criterion and correlation analysis of the data.

14. The method of claim 1, wherein estimating the gain multipliers includes:
estimating gain multipliers for each submodel instead of estimating the full dynamical model; and
grading potential poor performing submodels based on a criterion that measures the distance between the gain multiplier and a unity gain.

15. The method of claim 14, wherein the estimated gain multipliers are unbiased estimates by use of noise modeling and input and output data filtering.

16. The method of claim 1, wherein for each factored SISO submodel, calculating a respective dynamic model uncertainty further comprises:
a. downloading the process model from the online controller;
b. converting each Finite Impose Response (FIR) curve (or a SISO submodel in other format) into a state space model by use of a state space realization algorithm;
c. re-assembling the converted SISO submodels into a MISO state space model for each subject controlled variable (CV) with a block-diagonal state space model structure;
d. generating the CV predictions and internal state variables by feeding the collected manipulated variables (MVs) and feed forward variables (FFs) data into the block-diagonal state space model;
e. re-estimating a C matrix of the block-diagonal structured state space model by use of Least-Squares estimation;
f. calculating a dynamic model predictive objective function which is defined as the deviation between the newly calculated FIR model curve and the original controller model curve augmented with the estimated gain multiplier;
g. grading the submodel with a criterion based on the calculated value of predictive objective function.

17. The method of claim 16 wherein the state space realization algorithm may include minimum realization and model reduction.

18. The method of claim 1, wherein for each factored SISO submodel, calculating a respective frequency-domain uncertainty further comprising of:
   a. downloading the process model from the online controller;
   b. dividing the MIMO model into multiple MISO submodels;
   c. calculating each MISO submodel's asymptotic variance with the collected data; and
   d. grading each SISO submodel based on the estimated model variance at two specific frequency points of $\omega=0$ and $\omega=\omega_T$.

19. The method of claim 1, wherein assessing the overall quality of each submodel further includes
   a. using a discrete grading system consisting of five model quality assessment measures: Good (G), Fair (F), Poor (P), Bad (B) and Unknown (U);
   b. employing four model quality indexes to assess and grade each submodel: Gain Multiplier, Dynamic Uncertainty, Frequency-Domain Uncertainty on Steady-State Gain and at Critical Dynamic frequencies;
   c. combing the assessment results using a fuzzy logic to obtain an overall model quality assessment score for each assessed submodel.

20. The method of claim 19, wherein identifying poor-performing submodels further comprises:
   using the four model quality assessment scores and an overall quality assessment rule to identify the poor-performing submodels; and
   presenting the model quality assessment result in a Model Quality Plot.

21. The method of claim 20 wherein the model quality plot is formed by: each row representing a MV, each column representing a CV and each cell representing a SISO submodel, each cell having a respective color determined by associated model quality assessment score.

22. The method of claim 1, wherein step e. of further perturbing the process variables relevant to the identified poor performing submodels further comprises:
   re-configuring an automated test scheme involving those relevant MVs and CVs in the submodel; and
   repeating steps b. and c. to perturb these process variables, collect and slice these process data.

23. The method of claim 1, wherein step f. re-identifying poor-performing performing submodels further includes:
   further screening the collected data relevant to the submodels based on data requirements for model identification;
   if necessary, repeat steps (b) and (c), until sufficient data is collected which satisfies the requirements for model identification;
   applying a cross-correlation analysis on targeted CVs and grouping correlated CVs together to form one or more MIMO submodels;
   re-identifying a dynamic state space model for each MIMO or MISO submodel by use of a pertinent subspace identification algorithm or any suitable identification algorithm;
   generating SISO FIR model curves for each submodel; and
   validating each re-identified submodel.

24. The method of claim 1, wherein step (g) updating the online controller model with the newly identified and validated submodels further includes:
   comparing changes between original submodels of the existing model and the re-identified submodels;
   confirming the validity of the resulting improved model;
   assembling a new model by replacing those poor-performing submodels with the newly identified ones;
   deploying the resulting improved model to the online controller wherein model update is performed online with the process continuing to operate normally.

25. An apparatus comprising:
   an online multivariable controller having a dynamic model of a subject process, the subject process having one or more manipulated variables and one or more controlled variables;
   a computer automated tester;
   a database to store data corresponding to at least one manipulated variable controlled by the controller and the tester and to store data corresponding to at least one controlled variable dependent on the at least one manipulated variable; and
   a performance diagnosis module executed by a processor and configured to assess quality of each submodel of the dynamic model and to identify poor performing submodels based on data from the database, the performance diagnosis module: (a) factoring the data into single input single output (SISO) dynamic model outputs and associated gain multipliers resulting in one or more factored SISO submodels, (b) estimating the gain multipliers from the data by use of a gain multiplier estimation algorithm, (c) for each factored SISO submodel, calculating a respective dynamic model uncertainty by use of a dynamic uncertainty estimation algorithm, (d) for each factored SISO submodel, calculating a respective frequency-domain uncertainty by use of an asymptotic variance algorithm, (e) assessing overall quality of each submodel by use of a set of fuzzy logic rules based on the factored SISO submodels, and (f) identifying poor-performing submodels based on the overall quality assessment.

26. The apparatus of claim 25, further including an automatic data slicer configured to select data suitable for diagnosis by the performance diagnosis module.

27. The apparatus of claim 26 wherein the data slicer further comprises:
   a status converter configured to download operational status data of manipulated variables and controlled variables and operational status of the controller, and the status converter configured to convert the status data into data flags associated with subsets of the at least one manipulated variable and the at least one controlled variable;
   a preparation module to select data segments by generating good or bad slices to prepare required data for model auditing and identification;
   a conditioner to automatically interpolate gaps in audited data due to missing or bad data; and
   a data slice generator configured to automatically exclude bad data during an event period for model auditing and identification,
   the data slice generator further automatically excluding highly cross correlated MVs data unusable for model auditing and identification.

28. A computer implemented method of identifying a multiple input multiple output (MIMO) dynamical model in process control, the method comprising:
   in a processor:
   factoring the dynamical model into submodels and associated gain multipliers, the model being implemented by a hardware processor;
   estimating the gain multipliers by use of a gain multiplier estimation algorithm, calculating respective dynamic model uncertainties of the submodels by use of a dynamic uncertainty estimation algorithm, calculating respective frequency-domain uncertainties the submodels by use of an asymptotic variance algorithm, evaluating each submodel's predictive performance using a set of fuzzy logic rules based on the estimated gain multipliers, the calculated dynamic model uncertainties and the calculated frequency-domain uncertainties, resulting in identifying poor-performing submodels; and updating the dynamical model automatically based on the evaluated predictive performance of each submodel and the resulting identified poor-performing submodels.

* * * * *

UNITED STATES PATENT AND TRADEMARK OFFICE
CERTIFICATE OF CORRECTION

PATENT NO.        : 8,560,092 B2
APPLICATION NO.   : 12/786052
DATED             : October 15, 2013
INVENTOR(S)       : Qingsheng Quinn Zheng and Hong Zhao It is certified that error appears in the above-identified patent and that said Letters Patent is hereby corrected as shown below:

In the Claims

In Claim 23, column twenty-one, line number 45, after "poor-performing" and before "submodels" delete "performing" (second occurrence on that line).

Signed and Sealed this
Tenth Day of December, 2013

Margaret A. Focarino
*Commissioner for Patents of the United States Patent and Trademark Office*